United States Patent [19]

Dolberg et al.

[11] 4,272,948

[45] Jun. 16, 1981

[54] OSCILLATING KNIFE CUTTING APPARATUS

[75] Inventors: Dale R. Dolberg, Hedrick; Jack L. Guiter, Ottumwa, both of Iowa

[73] Assignee: Deere & Company, Moline, Ill.

[21] Appl. No.: 66,138

[22] Filed: Aug. 13, 1979

[51] Int. Cl.$^3$ .............................................. A01D 55/00
[52] U.S. Cl. ...................................... 56/246; 56/293; 30/205
[58] Field of Search ................. 56/246, 247, 248, 240, 56/293, 241; 30/205, 206, 207, 240

[56] References Cited

U.S. PATENT DOCUMENTS

| | | | |
|---|---|---|---|
| 370,771 | 10/1887 | Fitzgerald | 56/246 |
| 1,381,518 | 6/1921 | Tandy | 56/304 |
| 2,534,924 | 12/1950 | Northquist | 56/248 |
| 2,654,985 | 10/1953 | Miller | 56/246 |
| 2,812,631 | 11/1957 | Koch | 56/246 |
| 3,339,354 | 12/1967 | Kessler | 56/98 |
| 3,740,936 | 6/1973 | Berger | 56/246 |
| 4,164,112 | 8/1979 | Jackson et al. | 56/295 |

Primary Examiner—G. E. McNeill
Assistant Examiner—John J. Wilson

[57] ABSTRACT

An oscillating knife cutting apparatus preferably for use on a row crop harvesting unit of a forage harvester to sever crop material from its standing position in a field as it is delivered into the harvester. The apparatus comprises a main support with a main pair of knives fixed thereon, a bearing fixed to said main support, a shaft rotatably mounted in said bearing, and a secondary support with a knife fixed thereto. The secondary support is mounted on said shaft for oscillatory movement therewith relative to said main support. The secondary knife is disposed between the pair of main knives and is used to sever material disposed between the secondary knife and each of the main knives. The secondary knife is adjustably mounted for movement toward the plane defined by the main knives by adjustment of a member threadably mounted longitudinally of the shaft whereby rotation of the threaded member frictionally engages a clamp mounting the secondary support on the shaft. Also to compensate for uneven wear of the knives, one end of the secondary knife is bendable toward the plane defined by the main knives through rotation of a screw threadably mounted in the secondary support.

12 Claims, 6 Drawing Figures

FIG. 5
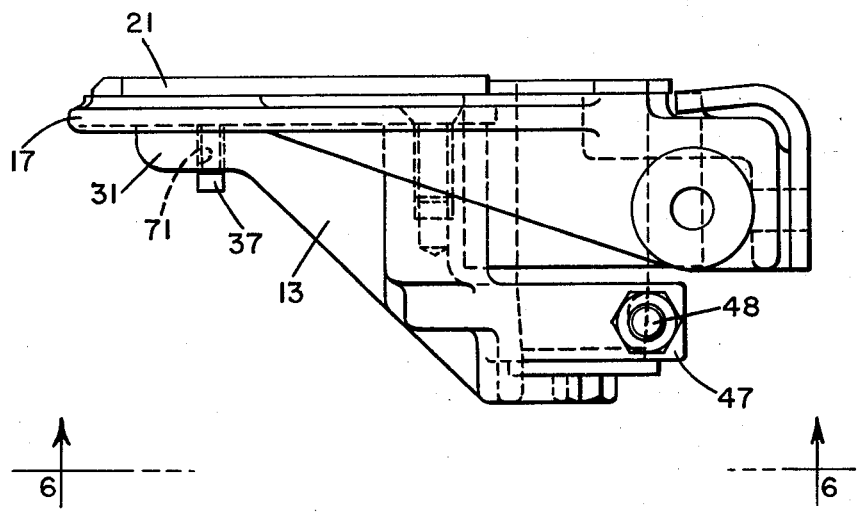
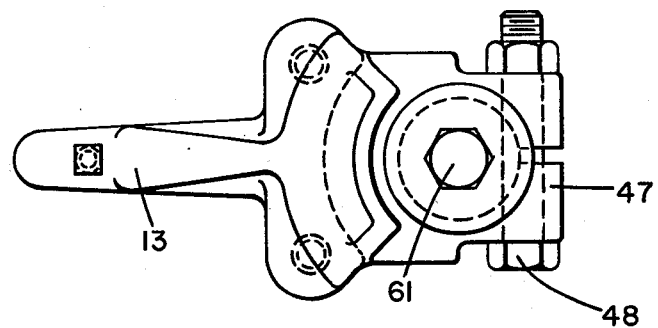
FIG. 6

OSCILLATING KNIFE CUTTING APPARATUS

BACKGROUND OF THE INVENTION

This invention relates to cutting apparatus and more particularly to an oscillating knife cutter having particular utility in agricultural equipment such as a forage harvester, combine and the like.

Oscillating knife cutters, as used on a row crop harvesting unti of a forage harvester, are used to sever the forage initially in its standing position in the field as the forage is being taken into the harvester by the feeding mechanism of the row crop unit. Prior art designs of such cutters for forage harvesters have proved to be unsatisfactory due to poor durability, to the high cost of repair and to the difficulty of making adjustments of the knives of the cutter periodically during use. In one commercial prior art design (shown in FIGS. 1-3 herein), the cutter includes a main support with a pair of main knives fixed thereon. A stationary central shaft is permanently fixed to the main support. A secondary support with a knife fixed thereto is rotatably mounted on the shaft for movement relative to the main support. Adjustment of the main knives relative to the secondary knife is made by shims positioned between each main knife and the main support. The central shaft for supporting the secondary knife is subject to high wear in the area adjacent the position of the secondary support. This condition is worsened because of the exposure of the apparatus to dirt and other foreign matter during use of the knife. After excessive wear of the shaft, repair of the cutting apparatus requires replacement of both the main support and the shaft causing an excessively high cost of repair.

Also, adjustment of the fixed main knives relative to the secondary oscillatory knife is difficult because of the placement of the cutter on the forage harvester underneath the row crop attachment. This placement requires the entire cutting apparatus to be removed from the harvester to permit access to the main knives for removal or changing of the shims for adjustment of the knives.

Accordingly, it is an object of this invention to provide an improved oscillating knife cutting apparatus.

Another object of this invention is to provide an oscillating knife cutting apparatus wherein the knives may be adjusted relative to each other in a simple manner.

Still another object of this invention is to provide a cutting apparatus with improved life and reduced repair costs.

SUMMARY OF THE INVENTION

These and other objects of the invention which will be apparent from a consideration of the following description and accompanying drawings are accomplished by a cutting apparatus comprising a main support with a pair of main knives fixed thereon, a bearing fixed to the main support, a central support shaft rotatably mounted in said bearing, and a secondary support with a secondary, oscillatory knife fixed thereto. The secondary support is mounted on said shaft for oscillatory movement therewith relative to the main support. The secondary knife is disposed between the pair of main knives and is used to sever crop material disposed between the secondary knife and each of the main knives. The secondary knife is adjustably mounted on the shaft for movement toward the plane defined by the main knives by adjustment of a member threadably mounted longitudinally of the shaft. The support shaft for the secondary knife is replaceably fixed both to the main support and to the secondary support permitting individual replacement of each part.

BRIEF DESCRIPTION OF THE DRAWINGS

FIG. 5 is a side elevational view of the oscillating knife cutter shown in FIG. 3 taken along line 5—5.

FIG. 6 is a bottom view of the oscilliating knife cutter shown in FIG. 5 taken along line 6—6.

DESCRIPTION OF THE PREFERRED EMBODIMENT

Figure 1:
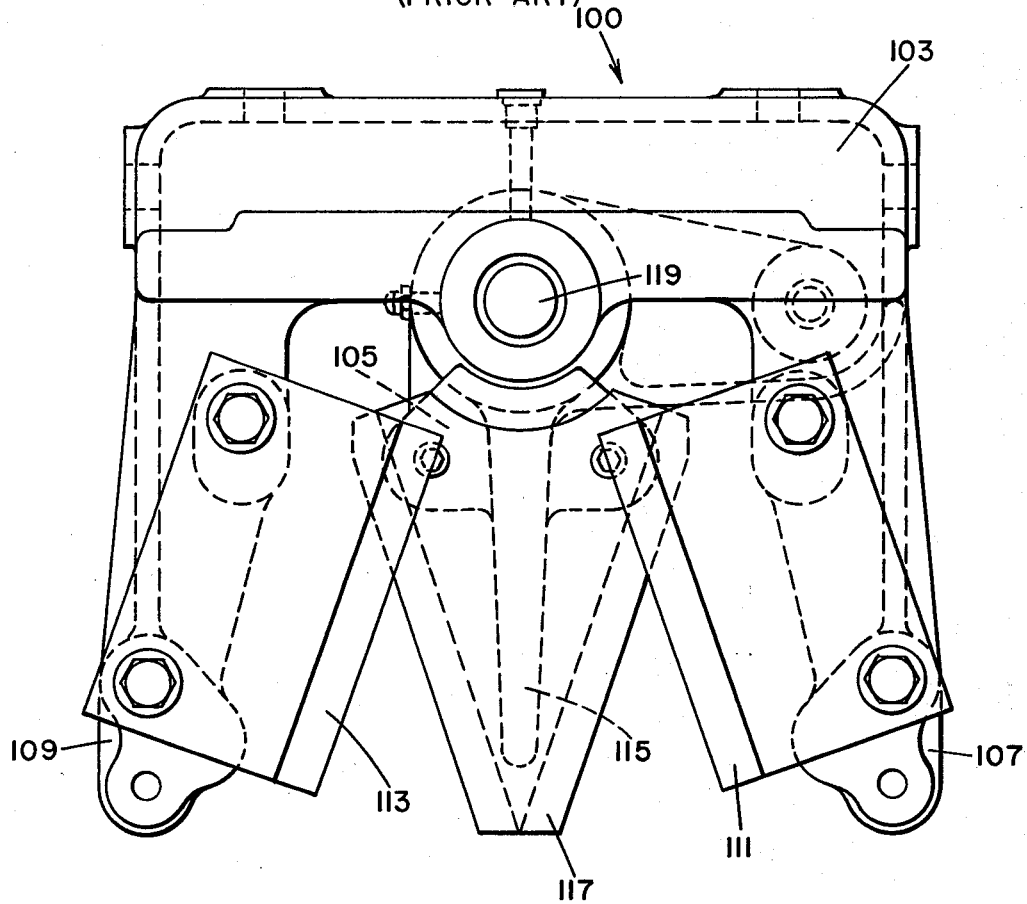
FIG. 1 is a top plan view of an oscillating knife cutter in accordance with one prior art design.
Figure 2:
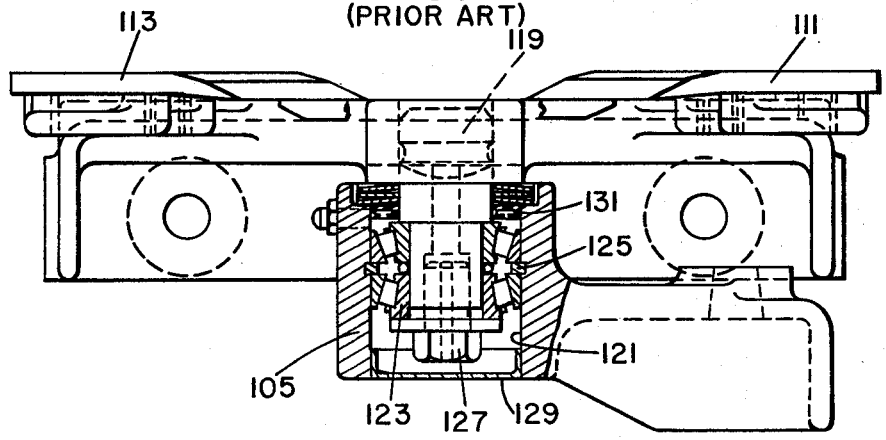
FIG. 2 is a fragmentary side view of the cutter shown in FIG. 1.
Figure 3:
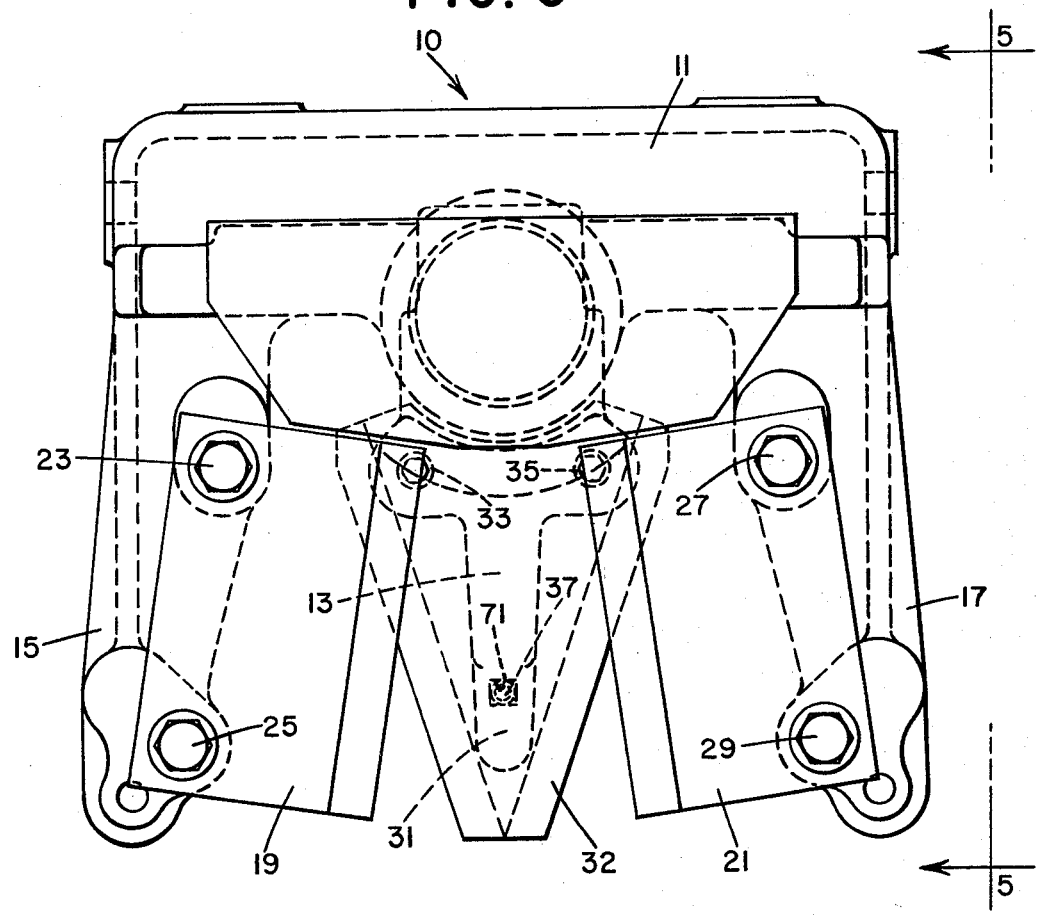
FIG. 3 is a plan view of an oscillating knife cutter in accordance with one preferred embodiment of this invention.
Figure 4:
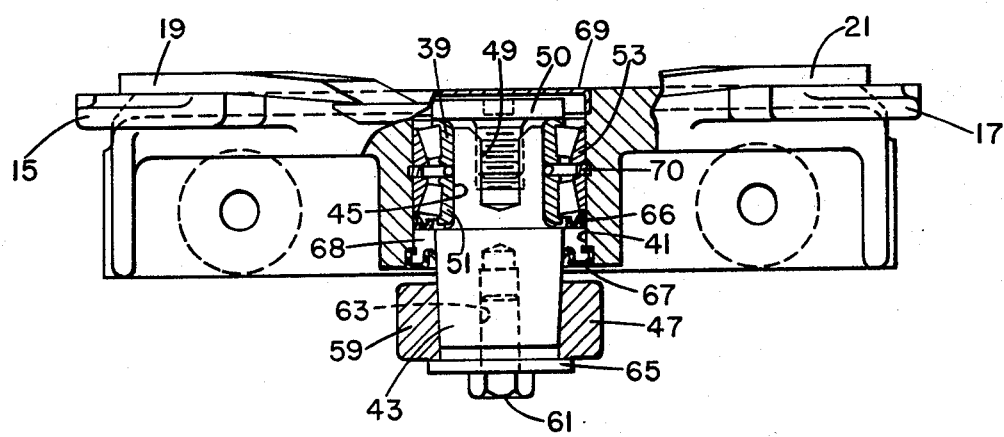
FIG. 4 is a fragmentary side view of the cutter shown in FIG. 3.

FIGS. 1 and 2 show one prior art oscillating knife cutting apparatus for a row crop attachment for a forage harvester over which the invention herein is an improvement. Cutting apparatus 100 comprises a main, fixed support 103 and a secondary support 105 mounted for oscillatory movement relative to main support 103. Main support 103 includes a pair of opposed arms 107 and 109 to which a pair of fixed main knives 111 and 113 are fixed respectively via a plurality of bolts. Secondary support 105 includes an arm 115 to which a secondary knife 117 is fixed.

Main support 103 further includes a central support shaft 119 which is permanently welded to main support 103. Secondary support 105 is provided with a central opening 121 which is coaxially disposed over central support shaft 119 and is mounted for oscillatory movement relative thereto in a bearing 123. Bearing 123 is fixed in the inner wall of opening 121 in support 105 via a snap ring 125. The ends of opening 121 are sealed by seal 131 and cap 129, respectively. The sidewall of shaft 119 adjacent seal 131 is an area of high wear caused by the exposure of the sidewall and seal 131 to dirt and other foreign material and the relative movement between shaft 119 and seal 131. As the surface of shaft 119 wears adjacent surface 131, foreign matter enters into the area adjacent bearing 123 and further deteriorates operation of the cutting apparatus 100. When replacement of shaft 119 is necessary due to excessive wear, it is necessary to replace not only shaft 119 but main support 103, thereby giving rise to high repair costs.

Fixed main blades 111 and 113 are adjustably mounted relative to main support 103 and, therefore, relative to secondary knife 117 via metal shims (not shown) which are positioned between arms 107 and 109 and the undersurfaces of blades 111 and 113, respectively. The height of blades 111, 113 is adjusted by varying the dimension of the shims. In one commerical forage harvester, the cutting apparatus is positioned beneath the base of the row crop attachment which prevents access to knives 111 and 113 for adjustment without removal of the complete apparatus 100 from the harvester.

A preferred embodiment of an oscillating knife cutting apparatus 10 in accordance with the features of this invention is shown in FIGS. 3-6. Apparatus 10 has primary utility as a cutter for a row crop attachment on a forage harvester for severing forage such as corn, maize, sorghum and other row type forage crops, etc. from a standing or leaning position in a harvesting operation.

Cutting apparatus 10 (FIGS. 1,5) comprises a main, fixed support 11 and a secondary support 13 mounted for oscillatory movement relative to main support 11. Main support 11 includes a pair of opposed arms 15, 17 to which a pair of fixed main knives 19, 21 are fixed, respectively, via bolts 23, 25, 27, 29. Secondary support 13 (FIG. 5) includes an arm 31 to which a secondary knife 32 is fixed thereto via bolts 33, 35.

Main support 11 (FIG. 4) further includes an integral seal bearing 39 with seal 66 fixed in a central opening 41 for accommodating relative motion between supports 11, 13. A shaft 43 includes first and second sections. The first section is disposed coaxially in a central opening 45 of bearing 39 to permit oscillatory movement shaft 43 relative to main support 11. Secondary support 13 further includes a clamp 47 fixed to the second section of a shaft 43 to enable oscillation of support 13 with shaft 43 and relative to support 11. Knife 32 is movable with shaft 43 in a plane parallel to the plane defined by main knives 19, 21 for severing material disposed between knife 32 and knife 19 and between knife 32 and knife 21. Secondary support 13 may be driven in an oscillatory manner by a conventional means such as by a Pittman-type drive attached to an extension of support 13, which is shown in more detail in U.S. Pat. No. 3,339,354, the disclosure of which is hereby incorporated by reference herein.

Shaft 43 is fixed in an inner race 51 of bearing 39 via a bolt 50 which is threadably mounted in a longitudinal opening 49 in shaft 43. In accordance with one feature of this invention, removal of bolt 50 permits easy removal and replacement of shaft 43 independently of bearing 39, main support 11 and secondary support 13. The independent replaceability of each major component of the apparatus provides reduced repair costs for cutter 10 relative to prior art cutters. An outer race 53 of bearing 39 is fixed to main support 11 by snap ring 70.

Bearing 39 is sealed at each end of opening 41 from exposure to dirt and other foreign matter by seals 66, 67 and cap 69. A grease cavity 68 is formed in the volume surrounding shaft 43 and between seals 66, 67. A grease fitting (not shown) is provided to enable foreign material to be flushed from cavity 68 to enhance further the life of the seal and to prevent deterioration of shaft 43 and bearing 39. Bearing 39 may be of any conventional construction such as tapered roller bearings shown herein. Alternatively, ball bearings or needle bearings may be used.

In accordance with another feature of this invention cutting apparatus 10 (FIG. 4) is further provided with adjusting means 59 which comprises a bolt 61 threadably mounted in an opening 63 in shaft 43. The degree of frictional engagement of clamp 47 on shaft 43 is adjustable via a clamp bolt 48 (FIGS. 5,6). With clamp bolt 48 in a loosened condition, rotation of bolt 61 engages washer 65 with one end of clamp 47 and slides clamp 47 longitudinally of shaft 43. Axial movement of clamp 47 along shaft 43 adjusts the position of secondary knife 32 in a direction perpendicular to the plane defined by main knives 19, 21 so as to ensure engagement of secondary knife 32 with main knives 19, 21 and to enable compensation to be made for wear of the knife edges periodically during use. To prevent inadvertent sliding of clamp 47 along the shaft 43, the inner diameter of clamp 47 and the outer diameter of shaft 43 are provided with complementary tapers so as to ensure a tight frictional engagement when bolt 48 is in a tightened condition.

In accordance with still another feature of the invention, additional compensation for uneven wear of the secondary and main knives is provided by a bending means, which in this instance is a screw 37 (FIGS. 3, 5) fixed in one end of arm 31. The tip of secondary blade 32 is moveable toward and away from arm 31 by rotation of screw 37 in threaded opening 71 in arm 31.

It will be appreciated by those skilled in the art that while apparatus 10 in the preferred embodiment described above has a pair of fixed main knives 19, 21, an embodiment of the apparatus may be provided with only one fixed main knife. In addition, in the preferred embodiment knives 19, 21 are fixed and knife 32 is mounted for oscillatory movement relative thereto; however, it will be recognized that knife 32 can be fixed and knives 19, 21 can be mounted for oscillatory movement relative thereto. Also, while the preferred embodiment of this invention has been described for use with a forage harvester, it will be appreciated by those skilled in the art that the cutter may be used on other types of equipment, particularly agricultural equipment, where durability under adverse cutting conditions is important. Accordingly, it is intended that all such modifications and applications as are within the true spirit and scope of the invention be comprehended within the appended claims.

We claim:

1. A cutting apparatus comprising:
   (a) a main support comprising at least an arm;
   (b) at least one main knife fixed to said arm and defining a first plane;
   (c) a bearing fixed to said support;
   (d) a shaft rotatably mounted in said bearing;
   (e) a secondary support, said support comprising a clamp slidably mounted on said shaft;
   (f) a secondary knife fixed to said secondary support and defining a second plane parallel to said first plane, one of said secondary and main knives movable relative to the other for severing material disposed between said secondary and main knives; and
   (g) means for adjusting the position of one of said second knife and said main knife in a direction perpendicular to said first plane, said adjusting means comprising a member threadably mounted in said shaft, movable longitudinally of said shaft and engageable with said clamp for sliding said clamp along said shaft by rotation of said member.

2. The apparatus of claim 1 wherein said outer diameter shaft and the inner diameter of said clamp have complementary tapers.

3. The apparatus of claim 1 wherein said main support has a second arm disposed opposite to said one arm; and further comprising a second main knife, said second main knife fixed to said second arm, said secondary knife disposed between said one and second main knives and wherein said one of said secondary and main knives movable relative to the other is said secondary knife.

4. The apparatus of claim 1 wherein said secondary support comprises an elongated secondary support arm and said secondary knife is fixed to said secondary support arm; and further comprising means for bending one end of said secondary knife relative to said secondary support arm.

5. The apparatus of claim 4 wherein said bending means is a screw means threadably mounted in one of said secondary support arm and secondary knife.

6. The apparatus of claim 1 further comprising means for detachably mounting said shaft to said main support.

7. The apparatus of claim 6 wherein said mounting means is a member threadably mounted longitudinally of said shaft and engageable with said bearing.

8. An oscillatory knife cutter comprising:
(a) a fixed support having an opening therein;
(b) a first knife defining a first plane and fixed to said fixed support;
(c) a bearing comprising an inner and an outer race, said bearing fixed in the opening of said fixed support;
(d) a shaft inserted through said bearing, detachably fixed to said inner race and rotatable relative to said fixed support;
(e) an oscillatory support detachably fixed to said shaft; and
(f) a second knife defining a second plane parallel to the first plane and fixed to said oscillatory support, said second knife oscillatable in said first plane for severing material disposed between said first and second knives.

9. The cutter of claim 8 wherein said shaft extends generally transverse to said first plane and has first and second sections, said inner race is mounted coaxially of said first section, said first section is disposed adjacent first main knife, said second section extends from the end of said first section remote from said first knife, said inner race of said bearing is mounted coaxially of said first section; and said oscillatory support comprises a clamp slidably mounted on the second section of said shaft for adjusting the position of said second knife relative to said first knife.

10. The cutter of claim 9 further comprising means for adjusting said oscillatory support, said adjusting means comprising a member threadably mounted in said shaft, movable longitudinally of said shaft and engageable with said clamp for sliding said clamp along said shaft by rotation of said member.

11. The cutter of claim 9 further comprising means for detachably fixing said shaft to said inner race of said bearing, wherein said fixing means is a member threadably mounted longitudinally of said shaft and engageable with said inner race of said bearing.

12. The cutter of claim 8 further comprising a first seal surrounding said shaft for sealing said bearing at one end said inner and outer races, a second seal positioned at one end of said fixed support opening, surrounding said shaft and spaced from said first seal longitudinally of said shaft, said first seal, said second seal, said shaft and the inner wall of said opening defining a grease cavity.

* * * * *